June 11, 1929.   W. H. C. NESS   1,716,791
ELECTRICAL AIR CONDITIONING AND CIRCULATING DEVICE
Filed Nov. 28, 1928   2 Sheets-Sheet 2
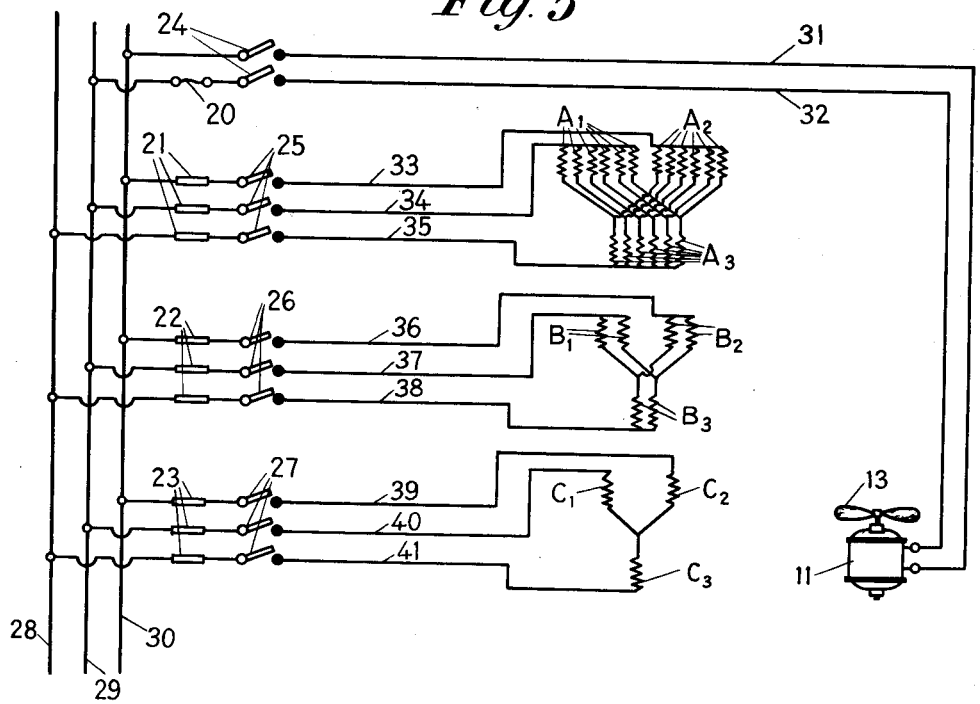
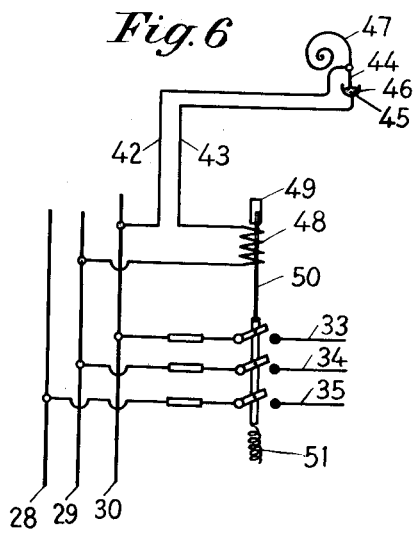
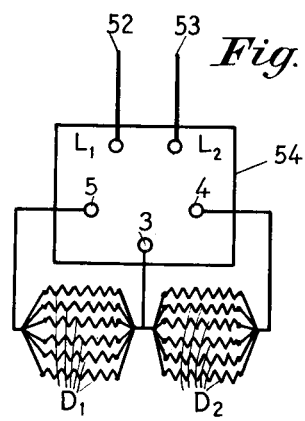
INVENTOR
WILLIAM H.C.NESS
BY
Raymond L. Barton
ATTORNEY Patented June 11, 1929.

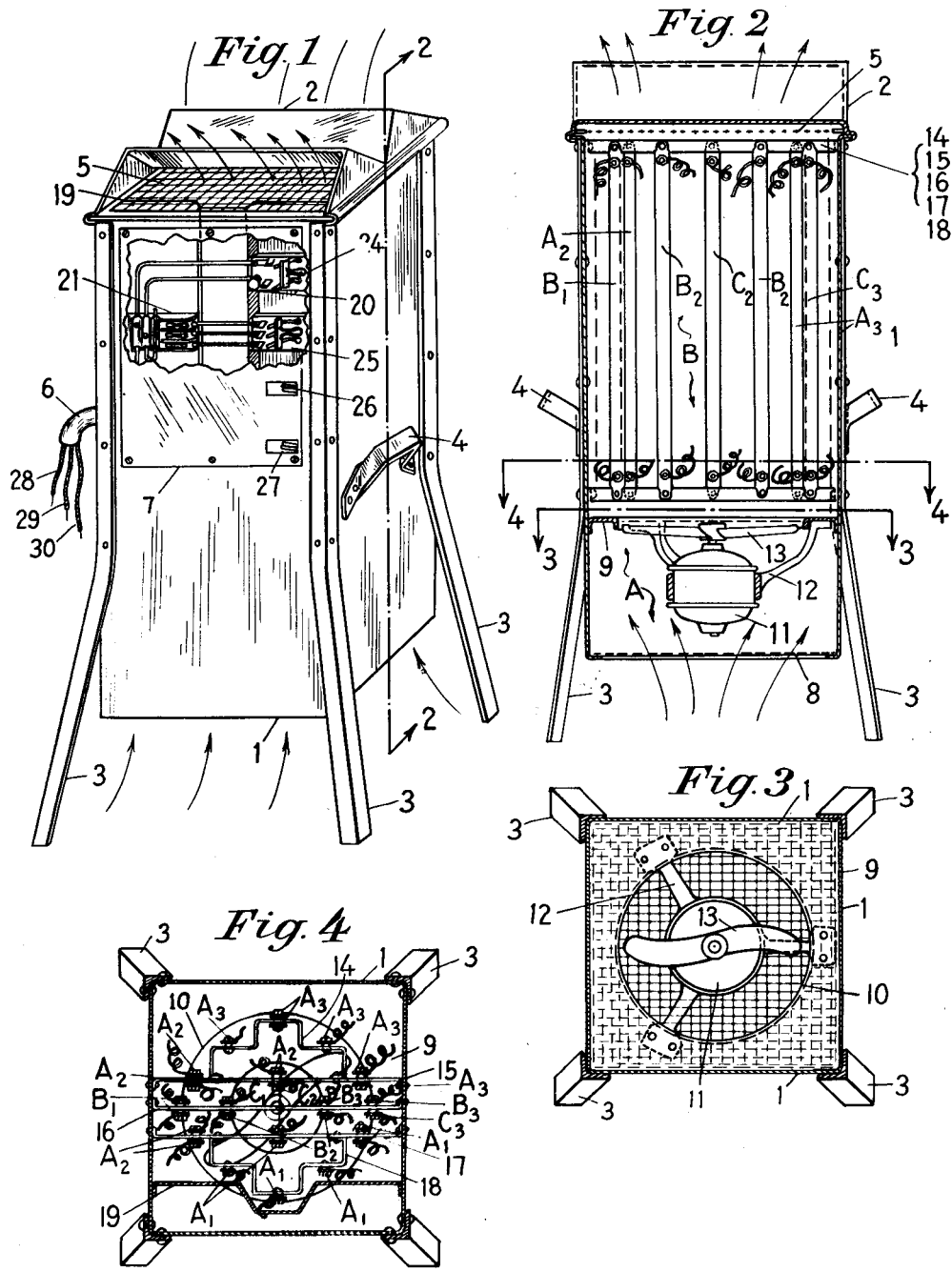

1,716,791

UNITED STATES PATENT OFFICE.

WILLIAM HENRY CLAY NESS, OF LOS ANGELES, CALIFORNIA, ASSIGNOR TO MASTER FAN CORPORATION, OF LOS ANGELES, CALIFORNIA.

ELECTRICAL AIR CONDITIONING AND CIRCULATING DEVICE.

Application filed November 28, 1928. Serial No. 322,523.

My invention relates to air heating improvements in conditioning and circulating means and especially to apparatus of this character adopted for use in fruit ripening rooms and the like.

Among the objects of my invention are to provide, in a device of this character, improved means to simultaneously heat and circulate the air as heated throughout the entire compartment in which the device or devices are placed so as to maintain a constant agitation or diffusion of the gas and air therewithin; to produce color so quickly in fruit, especially lemons, as to eliminate the excessive shrinkage; to materially enhance the quality, price and sale of second grade runs of fruit; to avoid rehandling of crates and boxes by reason of a uniform circulation of air being maintained throughout the ripening rooms; to further provide in a device of this character, improved means for maintaining a constant temperature and with black heat only; to still further provide a device of this character which will meet the approval of underwriters and one which will be free from gas fumes, a device which is portable and can be used in any position and is particularly adapted for use in box cars in conjunction with ripening fruit and the like while the same is in transit.

Still further to provide a device having improved means to produce a complete circulation of the admixture of gas and air whereby the green mature fruit and vegetables packed in crates and boxes may be properly ventilated thus eliminating loss of time between gas charges; to care for ventilating the fruit and as a consequence thereof to greatly accelerate the coloration of citrus fruits and vegetables and their ripening. Especially is this important in the ripening of fruits during transportation when a limited time is had between the shipping and unloading of the cargo.

The objects hereinbefore related may be employed through and embodied into any suitable form, and therefore, for the purpose of explanation, a preferred arrangement, with the proper correlative parts, is shown in the accompanying drawings, wherein—

Figure 1 is a perspective view of a heating structure, incorporating the principles of this invention, with a portion of the exterior broken away to show the switch plate and the switches thereon.

Figure 2 is a detail vertical longitudinal cross-section taken on the line 2—2 of Figure 1.

Figure 3 is a detail horizontal cross-section taken on the line 3—3 of Figure 2.

Figure 4 is a detail horizontal cross-section taken on the line 4—4 of Figure 2.

Figure 5 is a wiring diagram for the larger type of heater using three phase current adapted for manual operation.

Figure 6 is a wiring diagram incorporating the use of an automatic thermostatic control to be used in conjunction with the wiring diagram illustrated in Figure 5 when it is desired to operate the heater automatically.

Figure 7 is a wiring diagram for the smaller type of heater when supplied by a single phase current.

Among the nationally known methods for accelerating the coloration of citrus fruits, and the ripening of vegetables in general, the use of ethylene gas on account of its maturative qualities seems to be the general trend.

By the continued application of either ethylene or propylene gas an actually green fruit can be made to undergo exactly the same changes in composition that occur in the natural ripening of the fruit. In fact, all important fruits and vegetables of the tropical and temperate climates have been experimented on with complete success.

Ethylene gas will produce a better flavor in musk, honeydew and casaba melons and it is useful in removing excess acidity from early apples, plums, rhubarb, pineapples and other fruits.

In the past, ethylene gas has been used chiefly for coloring citrus fruits, and by its use it has been possible to make green fruit appear ripe. Now it is very popular for artificial maturing. Tomatoes ripened after removal from the vine in winter are liable to be excessively acid, but if treated with ethylene gas, they have a firm flavor free from excess acidity; in fact tomatoes so ripened have a better flavor than when ripened on the vine. Celery can be blanched perfectly in sixty hours and has a fine color, sweeter taste and less stringiness.

Contingent upon the successful use of ethylene gas and its effect on the maturation of the fruit is the temperatures regulation, the concentration of gas and the ability to correctly ventilate the fruit.

The simple requirement of a room tight enough to prevent excessive leakage of gas is easily met. The room must be kept at 65-70 degrees F. At temperatures below 65 degrees F. ripening is slow, above 70 degrees rots may develop too rapidly. At 65 degrees F. only 48 hours are required to ripen bananas from a very green state.

Ethylene gas diffuses quickly throughout crates of celery or through loose boxes of fruit; it causes a sudden jump in the respiratory rate after its application. Attendant with this increased rate of respiration, the fruit acids and tannins disappear.

In order to avoid the risk of contaminating the fruit with traces of ethylene gas, a constant circulation of the permeated atmosphere is essential. It is also of paramount importance that the temperature be evenly maintained by the use of black heat.

To produce a correct state of equilibrium of the temperature necessitates the use of a properly heat productive temperature controlled air circulating device.

It has been found expedient to use a device such as applicant's wherein are incorporated features for supplying the aforementioned requirements arising from the use of ethylene gas in fruit ripening.

As a factor in aiding for the provision of a constant supply of fruit to great centers of population, and as a means for treating these fruits during shipment, the use of applicant's device is considered of great value.

While simple and efficient means are herein provided for accomplishing the objects of the invention, and the elements shown and described are well adapted to serve the purposes for which they are intended, it is to be understood that no limitation is made to the precise structural detail exhibited in the drawings, though they be a preferred embodiment now, but that changes, alterations and modifications may be resorted to without departing from the principles of the invention, or sacrificing any of the advantages claimed, the invention being herein shown and described as particularly designed for the purpose of circulating impregnated heated air in the process of ripening fruit, but the invention may also be utilized for various analogous purposes and in various analogous ways in this or in any other field involving the novel scheme herein set forth.

Throughout the several illustrations like reference characters apply to like parts.

The present invention comprises a main housing 1, the side and end walls being preferably of sheet metal, substantially rectangular in form, to which are applied the handles 4, and is provided with a detachable hood baffle or discharge funnel 2, with an air discharge screen 5 therein, and has a motor and fan compartment A, a heating chamber B for the heating elements which extend longitudinally within the structure, and structural supporting legs 3 which are extended upwardly to reinforce the corner portions of the housing by riveting the same thereto.

The hood baffle is provided with tapered discharge openings both frontwardly and rearwardly of the housing in order to give the heated air a circular or whirling effect as it exits, thus keeping all the impregnated air within an enclosure wherein the heater may be used, in constant agitation. This eliminates any unequal saturation or absorption by the fruit of the ripening gas during the process of ripening and consequently insures a much higher quality and more delicious flavor in the fruit.

The motor and fan compartment A is shown in Figure 2 within the bottom portion of the heater and has a diaphragm plate 9 separating said compartment from the heating chamber B. Said diaphragm is provided with a circular hole 10 the diameter of which is slightly greater than that of the path traversed by the fan blade.

It has an exterior flange enabling it to be fastened to the main housing 1, and is further provided with an inner flange circumferizing the hole 10 wherein the fan blade 13 is adapted to rotate.

The fan blade 13 is driven by a shaft in the mtor 11, said motor being supported by brackets 12 which are fastened to the diaphragm plate 9.

The motor and fan compartment is further provided with a screened opening 8 in the bottom of the main housing through which cold air is drawn and forced upwardly through the heating chamber, later to be blown out through the hood and circulated as hereinbefore described.

In addition to providing a duct for the entrance of untempered air, the screened opening 8 further enables easy access to the motor compartment for oiling, adjusting and making needed repairs.

As hereinbefore stated the motor compartment is shown at the bottom. It is also feasible to have it located in the top portion of the housing as well and to blow the warm air out at the bottom. Such a modification is presumed to come well within the scope of this invention, and it is a matter of conjecture which arrangement is preferred.

The heating chamber B, containing the heating elements, is disposed between the motor and fan compartment and the detachable hood baffle.

It consists of a somewhat long rectangular chamber and contains a plurality of spaced black heat elements which are grouped in three groups shown diagrammatically one above the other in Fig. 5. In this view the three-phase Y or star connections contain the three legs $A^1$, $A^2$ and $A^3$ of a parallel Y. That is, there are 18 heating elements in the high heat group operable manually by a three-way switch later to be described in relation to Fig. 5.

The medium heat Y group consists of six heating elements $B^1$ $B^2$ and $B^3$ and the low heat of three elements $C^1$, $C^2$ and $C^3$ making the total sum of elements 27 in all.

Said heating elements are arranged in spaced relation and are supported at their opposite ends with iron grills consisting of a plurality of flat iron bands 14, 15, 16, 17 and 18, said bands being riveted to the sheet metal sides composing the metal housing.

The upper metallic grill is composed of the outer side bars 14 and 18 similarly shaped but reversely arranged; and the three parallel intermediate grill bars 15, 16, and 17. The outer grill bars each have a rectangular U-shaped central portion which is outwardly directed and to the center of which is secured the resistance heating bar $A^3$ (or $A^1$).

The attaching limbs of bars 14 and 18 are secured to the adjacent intermediate grill bar (15 or 17). This construction is duplicated at the lower end of the heating chamber.

The central grill bars 15, 16 and 17 are secured to opposite walls of the casing; as well shown in Figure 4. This construction and arrangement of the grill bars makes it possible to attach at their upper and lower ends the elongated heating elements $A^1$, $B^1$, $C^1$, etc., chiefly in circular formation thus taking advantage of the whirling character of the ascending air current created by the fan.

The feed wires 28, 29 and 30 supply current to the opposite ends of said heating elements whereby and wherefrom the black heat is produced in such amounts as required to keep the temperature regulated at the right degree of heat.

The air speed of rotation of the fan 13 should be such as to allow the air to be properly heated before it leaves the appliance.

A vertical metal panel 19 partly shown in Figures 1 and 3 illustrates a means to support the fuses 20, 21, 22, 23, and switches 24, 25, 26, and 27. A metal panel 7 is provided to cover the fuses and switches, there being openings in the panel through which the handles of the switches are adapted to project. This feature may be seen by referring to Figure 1.

6 is a conduit connection for inlet of electric wires 28, 29 and 30, there being three wires (3-phase) for the large type of apparatus, and two wires 52, 53 (single phase) for the small type of apparatus.

The wiring of the various heating elements will now be described by referring particularly to Figures 5, 6, and 7.

The high heat Y-grouped heaters, of which there are 18 in this group, are marked $A^1$, $A^2$, and $A^3$. The medium heat Y-grouped heaters of which six heaters compose this group are marked $B^1$, $B^2$, and $B^3$. The "low heat" Y-grouped heaters, of which only three heaters compose this group, are marked $C^1$, $C^2$, and $C^3$.

Each of the foregoing groups have feed wires 33, 34, 35 for the high heat, 36, 37, 38 for the medium heat, and 39, 40, and 41 for the low heat.

Each feed wire to the high heat group is provided with a standard triple pole (cartridge) fuse 21, and a standard triple pole snap switch 25.

Likewise the feed wires to the medium and low heat groups are each provided with similar fuses and switches, the fuses and switches to the medium heat group being 22 and 26 and to the low heat group 23 and 27. 28, 29, and 30 are the three (three phase) wires which feed the entire heater apparatus, while 31 and 32 are the two wires (single phase circuit) which feed the fan motor 11.

24 is a double pole switch for the fan motor circuit. 20 is a special so-called "time limit" thermo fuse plug, which allows a certain maximum current to pass through the motor circuit 31, 32 for a predetermined rather long period of time and which melts only when the length of this time is excessive.

In Figure 6, the two wires 42 and 43 are for an additional circuit which extends the one shown in Figure 5. The purpose of said additional circuit is to operate the three triple pole snap switches not by hand, but automatically by the use of a thermostat 47. This thermostat carries and operates the needle 44 against the mercury 45 which is contained in the cup 46, and so closes the circuit feeding the solenoid 48 which pulls down solenoid core 49 and closes the triple pole snap switch by means of the connecting rod 50. Coil spring 51 counteracts the solenoid and opens the triple pole snap switch again when thermostat 47 interrupts needle 44 from mercury 45.

The purpose of the inclusion of the temperature regulation is to maintain a constant temperature in the ripening rooms at all times, and by so doing not only to promote the ripening effect on the fruit and to enhance the flavor thereof, but by avoiding overheating, to reduce the consumption of fuel to a minimum.

Since the moisture carrying capacity of air increases rapidly with its rising temperature, and since excessive dryness of the air in the average ripening room is far reaching in its unripening effect on the fruit, as it deprives the skin of its natural protection of moisture and color, it is quite essential that a uniform temperature be maintained.

In Figure 7 is illustrated a wiring diagram for the smaller type of heater to be fed by a single phase current only. The two feed wires are 52 and 53. The switch 54 contains five contacts, $L^1$, $L^2$, $L^3$, $L^4$ and $L^5$. Three heats are thus obtainable through different interconnections of the heater groups $D^1$ and $D^2$ having six heaters each.

Low heat: $D^1$ and $D^2$ in series, connect $L^1$ with 5 and $L^2$.

Medium heat: $D^1$ feed alone, connect $L^1$ with 5 and $L^2$ with 3.

High heat: $D^1$ and $D^2$ parallel, connect $L^1$ with 5 and with 4 and $L^2$ with 3.

By the use of the three phase current for the large type of apparatus and the single phase for the small type of apparatus, it is quite obvious from the three wiring diagrams hereinbefore described how it is possible to obtain variable heating effects to meet changeable conditions of the weather and ideal conditions for the proper method of fruit ripening.

I claim:

In a device of the character described, a casing having in opposite end portions thereof, cooperating grills within said casing to support heat-radiating elements, each of said grills consisting of a set of intermediate bars arranged transversely of the casing and in parallelism to each other, a co-operating side bar located at each side of said set of intermediate bars, each of said side bars having its end portions attached to the adjacent intermediate bar and having an out-bent central portion extending radially away from the grill as a whole of which it forms a part, heat radiating bars extending longitudinally of the casing and attached to and bridging the space between said grills, certain of said heat-radiating bars being attached to the outbent grill bar portions and others of said heating bars being attached to others of said grill bars so as to form a circularly arranged set of heat-radiating bars, the casing having air inlets and outlets at its ends, and an air fan positioned to drive a whirling current of air through said casing longitudinally along and over said heat-radiating bars.

WILLIAM HENRY CLAY NESS.